June 21, 1927.　　　　E. NEUMANN　　　　1,633,494
COOKING UTENSIL WITH HINGED AND REMOVABLE LID
Filed July 8, 1926
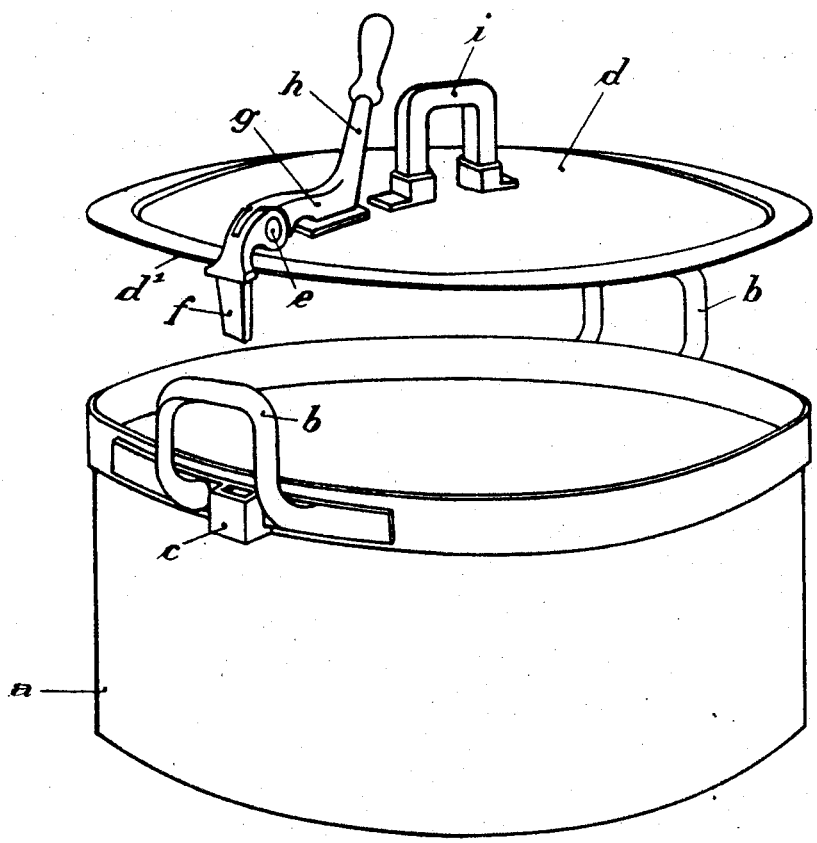
E. Neumann
inventor
Marks & Clark
Attys

Patented June 21, 1927.

1,633,494

UNITED STATES PATENT OFFICE.

EWALD NEUMANN, OF BRUNSWICK, GERMANY.

COOKING UTENSIL WITH HINGED AND REMOVABLE LID.

Application filed July 8, 1926, Serial No. 121,195, and in Germany February 18, 1925.

This invention relates to a cooking utensil with a hinged removable lid, which according to the invention is connected with the vessel by a joint, which is permanently united to one member (the lid or the vessel) and is connected with the other member (the vessel or the lid) in the manner of an electrical plug contact, so as to be readily releasable. The most important difference between this new arrangement and known cooking utensils of this kind consists in the fact that in the case of the latter the pivotal joint is only produced by the union of lid and vessel, whereas in the case of the present invention the pivotal joint itself cannot be taken to pieces. By this means the irksome assembling of the members of the joint, which for the most part has to be effected when they are hot, is rendered unnecessary. This is of advantage because the users of such vessels are almost always women who are not much accustomed to the assembling of mechanical parts.

One construction of the invention serving as an example is illustrated in perspective in the accompanying drawing with the lid lifted off.

The vessel $a$, or one of its handles $b$, carries a sleeve or socket $c$, which may be integral with the handle $b$. With the lid $d$ is permanently connected a pivotal joint $e$, one member of which forms a spike or plug $f$ capable of being introduced into the plug socket $c$ in the manner of an electrical plug contact. The other member $g$ of the joint forms a bell-crank lever $h$, which may comprise an insulated handle. Furthermore the lid may be provided with an ordinary handle $i$.

Such a joint $e$ holds the lid firmly and reliably to the vessel during manipulation and enables the emptying and filling of the vessel to be effected without taking away the lid. The lid can however still be separated from the vessel as hitherto by simply lifting it off. An essential point however is the fact that the lid, as is evident from the drawing, can be pivotally connected with the vessel by simply placing it thereon without touching the joint members $e$, $f$ or $c$.

The joint $e$ should be so dimensioned that the under draining rim $d^1$ of the erected lid $d$ is located above the pot $a$.

The sleeve $c$ may also be provided on the second handle $b$. The combining of the sleeve socket $c$ or of the two sleeves $c$ with the pot handles $b$, which would in any case be required, simplifies and cheapens the manufacture. It is preferable to give the sleeve $b$ and the spike $f$ a conical or tapered form, because the assembling of the parts is thereby facilitated.

Instead of the single spike $f$ a forked or U-shaped spike may be provided, for which two plug sleeves $c$ are provided, which are either separate or united to form a single piece.

What I claim is:—

1. In a cooking utensil, a receiving member, a lid member, means for hingedly and removably connecting the members together comprising a closed socket connected with one of said members, a plug pivotally connected to the other of said members for snug engagement with the socket, and the socket having its walls surrounding the outer engaging surface of the plug, substantially as and for the purposes set forth.

2. A cooking utensil including in combination, a vessel, a lid, a closed socket on the vessel adjacent the upper edge thereof, a plug pivotally connected to the lid and adapted to be removably arranged concentrically within and in frictional engagement with the walls of the socket.

3. A cooking utensil including in combination, a receiving vessel, handles rising from opposite sides thereof, a lid, a closed socket carried on the outer wall of the vessel adjacent one of the handles, a two part member mounted on the lid including a handle part rigid with the lid, a plug pivotally connected to the handle part and adapted to be snugly and frictionally engaged with the socket, the handle part being positioned in proximity to the handle on the vessel to facilitate raising of the lid, and the socket having walls surrounding the outer surface of the plug, substantially as and for the purposes set forth.

In testimony whereof I have signed my name to this specification.

EWALD NEUMANN.